Aug. 17, 1965  S. A. HAYES  3,201,049
PROPORTIONING EDUCTOR
Filed March 7, 1963  2 Sheets-Sheet 1
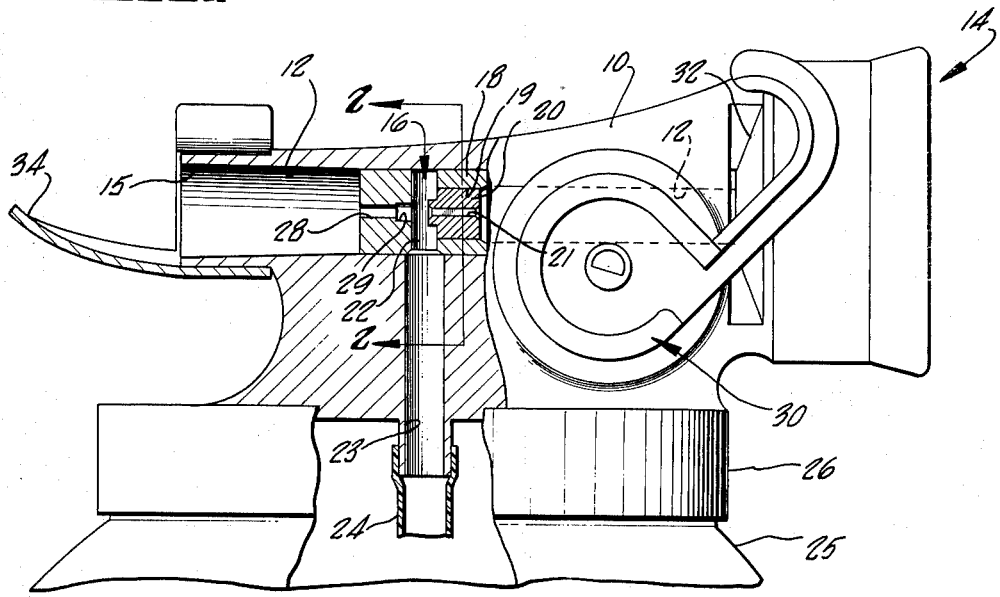
FIG_1_
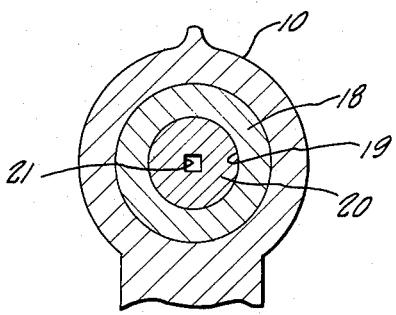
FIG_2_
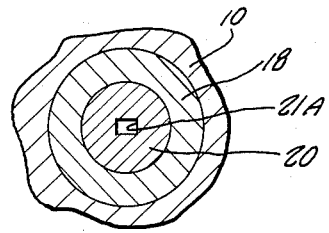
FIG_3_
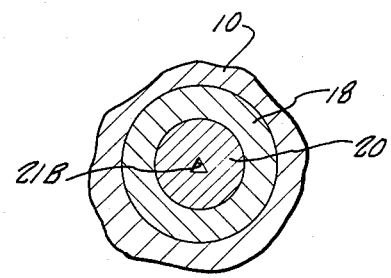
FIG_4_
INVENTOR.
STANLEY A. HAYES
BY
Christie, Parker & Hale
ATTORNEYS.

Aug. 17, 1965 S. A. HAYES 3,201,049
PROPORTIONING EDUCTOR
Filed March 7, 1963 2 Sheets-Sheet 2
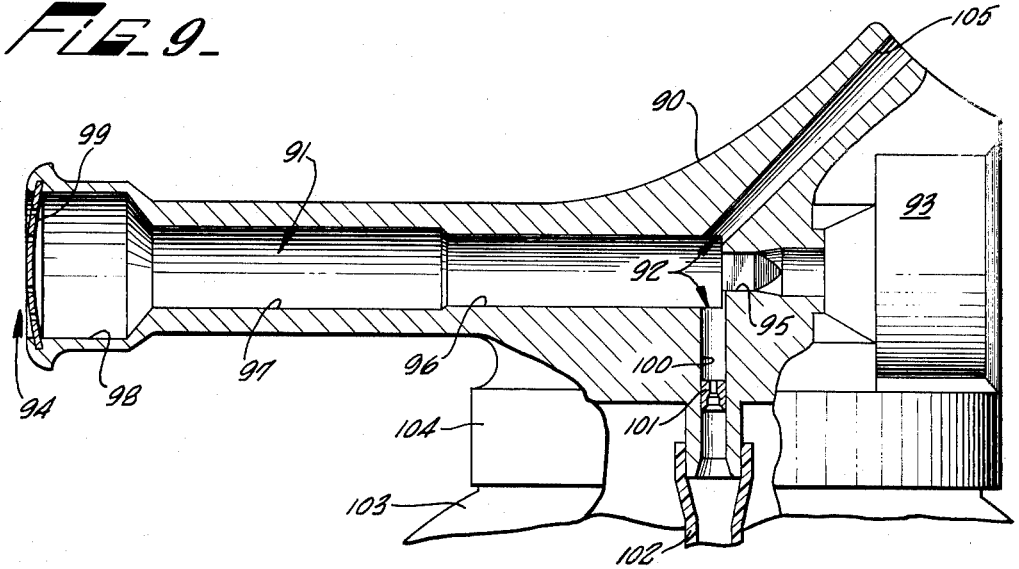
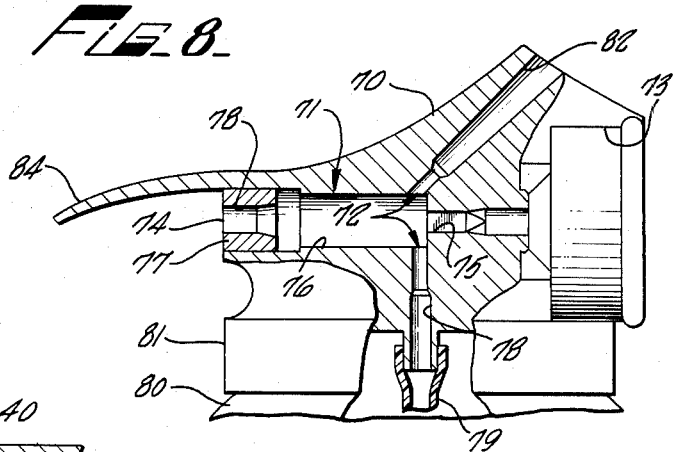
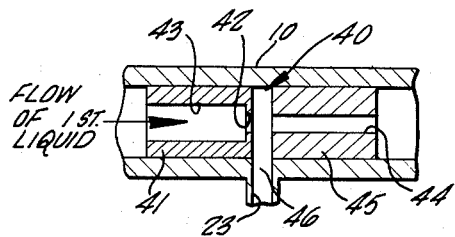
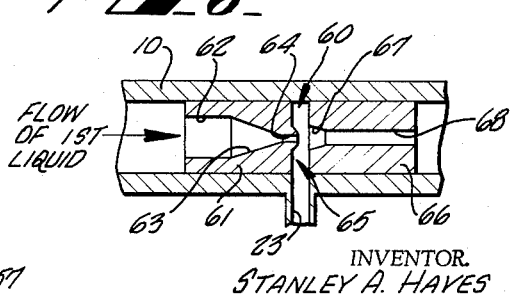
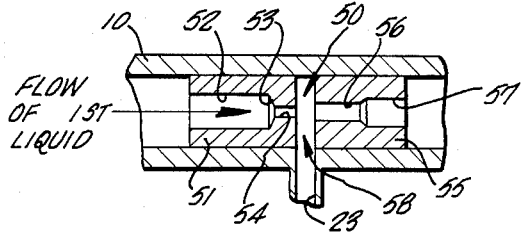
INVENTOR.
STANLEY A. HAYES
BY
Christie, Parker & Hale
ATTORNEYS.

United States Patent Office 3,201,049
Patented Aug. 17, 1965

3,201,049
PROPORTIONING EDUCTOR
Stanley A. Hayes, Arcadia, Calif., assignor to Hayes Spray Gun Company, Pasadena, Calif., a corporation of California
Filed Mar. 7, 1963, Ser. No. 263,628
9 Claims. (Cl. 239—433)

The present invention relates to eductors for educting a second liquid into a carrier stream of a first liquid and more particularly to a proportioning type eductor for providing a discharge stream having a desired ratio of the first and second liquids notwithstanding changes in pressure of the first liquid.

Various types of proportioning eductors for mixing a first liquid with a carrier stream of a second liquid have been widely used for applying liquid chemicals such as fertilizers, chemicals, fungicides and insecticides to plants, trees, lawns and agricultural crops. For example, garden hose sprayers of the type disclosed in my earlier Patents No. 2,381,589; No. 2,571,871; No. 2,592,896; and No. 2,388,445 (issued to James W. R. Stewart) function to educt a chemical solution into a stream of water under pressure from a garden hose connected to a city water system. These sprayers employ eductors which maintain the ratio of educted chemical to water constant over a wide range of water pressures, for example, 20 to 100 pounds. This action of maintaining a constant ratio of water to educted chemical over varying water pressures is defined as proportioning. Proportioning is extremely important when applying chemicals such as insecticides or fungicides to plants where the water pressures change since chemicals for garden and industrial use must be applied at a particular specific solution strength of water to educted chemical solution to obtain the desired control while preventing damage to the treated plants. The problem with treating such garden plants is that any toxicant, insecticide, etc., can cause injury to the plant as well as the insects to which they are applied. It requires a certain solution strength to kill the insects or control the disease for which the chemical is formulated. If the solution strength is not sufficient, the insects and diseases will not be controlled. On the other hand, if the solution strength is too concentrated, plant injury is very likely to occur.

Other factors are also involved in controlling plant insects and disease such as the humidity, temperature and other weather conditions. Such weather conditions, however, cannot be controlled by the gardener and the chemical formulators take this into account in arriving at a solution strength which will give satisfactory results most of the time without resultant injury to the plants. Such satisfactory results are possible only if the chemical is applied at the solution strength recommended by the formulator.

Proportioning garden hose sprayers such as those described in the above mentioned patents have critical relative dimensions, that is, once the dimensions of the passages in the eductor are set for a predetermined ratio of water to chemical solution, any change in the dimensions, particularly the diameter of the passages, will change the operating ratio of the sprayer. The chemical solutions applied with such proportioning sprayers will leave deposits on the passages through which the chemicals travel thereby requiring frequent cleaning of the critical passages of the prior art garden hose sprayers with a wire or the like if accurate results are to be achieved. Moreover, such cleaning if not carefully done will permanently destroy the accuracy of the sprayer.

To provide proportioning, it was considered necessary heretofore to employ an eductor having a relatively long cylindrical inlet passageway (a length at least twice its diameter) upstream from the aspiration chamber. See, for example, the inlet passage 40B, FIG. 3 of Patent No. 2,592,896. The inlet passageway of the prior art proportioning sprayers had had a length at least twice its diameter. It was not only considered necessary to provide a relatively long inlet passageway but even more important, it was thought necessary to provide a circular inlet passageway to provide a non-turbulent, relatively smooth discharge stream into the aspiration chamber.

It has been discovered that chemical deposits in the passages of an eductor may be eliminated to a large extent by providing a turbulent discharge stream into the aspiration chamber. This turbulent stream not only prevents undissolved particles of chemical from settling out but effectively washes all chemical solution out of the aspirtaion chamber and passages downstream from the aspiration chamber of the eductor after the chemical solution has been applied. This permits a sprayer to be used for long periods of time without requiring cleaning of the passages with a wire or the like.

In accordance with the present invention, there is provided a proportioning eductor for educting a second liquid into the carrier stream of a first liquid wherein the eductor includes an inlet passage, an aspiration chamber and a diffusion chamber disposed in series relationship. A conduit is provided for connecting the aspiration chamber to a source of the second liquid. A second conduit is provided for connecting the inlet passage to a source of the first liqued under pressure. The inlet passage is provided with a noncircular cross section for discharging a highly turbulent high velocity stream. The asipration chamber has a larger cross sectional area than the inlet passage to permit the boundary of the discharge stream from the inlet passage to directly contact the second liquid to permit entrainment of the second liquid into the first liquid. The outlet chamber is provided with a larger cross sectional area than the inlet passage and has a length at least equal to its diameter for confining the discharge stream from the inlet passage to transfer energy from the high velocity discharge stream to the second liquid. The invention is described in more detail in reference to the accompanying drawings in which:

FIG. 1 is an elevation view partially in section of a garden hose sprayer employing an eductor in accordance with the present invention;

FIG. 2 is a cross sectional view along lines 2—2 of the embodiment of FIG. 1;

FIG. 3 is a cross sectional view similar to FIG. 2 showing an alternative embodiment;

FIG. 4 is a cross sectional view similar to FIG. 2 illustrating another embodiment of the present invention;

FIG. 5 is a sectional view of another embodiment of an eductor which may be employed in the sprayer of FIG. 1;

FIG. 6 is another embodiment of an eductor that may be used in the sprayer of FIG. 1;

FIG. 7 is another embodiment of an eductor that may be used in the sprayer of FIG. 1;

FIG. 8 is an elevation view partially in section of another type of sprayer embodying an eductor in accordance with the present invention;

FIG. 9 is an elevation view partially in section of another type of sprayer utilizing an eductor in accordance with the present inventon.

Referring now to the drawings and more particularly to FIGS. 1 and 2 thereof, a garden hose sprayer is illustrated having a body member 10 which defines a liquid passageway 12 therethrough between an inlet 14 and an outlet 15. The inlet 14 may conveniently form a hose coupling to accept the male connection of a garden hose (not shown). An eductor indicated generally at 16 is disposed within the passageway 12 and includes a first bushing 18 and a second bushing 20. The bushing 20 is press fit into a cylindrical opening 19 in the upstream end of the bushing 18 as is shown in FIG. 1. The bushing 20 defines inlet passage 21 which has a square cross section as is shown in FIG. 2. The bushing 18 is also provided with a lateral bore 22 which functions as the aspiration chamber of the eductor and connects at its lower end with a chemical inlet passage 23 formed in the body member 10. The chemical passage 23 is coupled by means of a suction tube 24 to the chemical solution in the container 25 secured to the lower end of the sprayer 10 by means of suitable threads in a collar 26 of the body member 10. The bushing 18 also defines a diffusion or outlet passage 28 which is cylindrical and has a length at least twice its diameter. The bushing 18 further defines a receiving passage 29 disposed upstream from the diffusion passage 28 which is of larger cross sectional area than the passage 28 and serves to receive the combined discharge stream from the inlet passage 21 and the chemical solution which is entrained therein. A valve 30 (such as shown in U.S. Patent 2,741,453) is secured to the body member 10 to control the flow of the first liquid or water through the eductor 16. A back flow valve 32 (such as shown in U.S. Patent No. 2,646,063) is disposed between the valve 30 and the inlet 14 to prevent flow of liquid from the sprayer back to a water hose connected to the coupling 14 as is well known in the art.

In operation, when the valve 30 is open, water under pressure, for example 20 to 100 p.s.i. is applied to the inlet and flows through the passage 12 to the inlet passage 21 of the eductor 16. The square cross sectional form of the inlet passage 12 provides a highly turbulent and high velocity discharge stream into the aspiration chamber 22. This discharge stream impinges on the walls of the diffusion passage 28 and seals in that passage to create a low pressure area in the aspiration chamber 22. This low pressure raises chemical solution from the container 25 through the conduit 24 and the passage 23 into the aspiration chamber where it is entrained in the discharge stream from the passage 21. The diffusion passage 28 is concentrically aligned with the inlet passage 21 and of larger cross sectional area than the inlet passageway. This diffusion passage functions to confine the discharge stream from the inlet passage 21 to allow the transfer of energy from the high velocity stream of water to the chemical solution in the aspiration chamber 22. The water issuing from the diffusion passage 28 impinges on the deflector 34 where it is broken into small droplets.

The non-circular (square) cross sectional configuration of the inlet passage 21 provides a highly turbulent discharge stream into the aspiration chamber 22 which thoroughly mixes the chemical solution with the water. The highly turbulent discharge stream into the aspiration chamber 22 prevents undissolved particles in the chemical solution from settling out and coating the walls of the eductor 16. The turbulent discharge stream further provides a washing action to effectively wash the chemical solution out of the aspiration chamber and passages downstream from the aspiration chamber after the flow of chemical solution has ceased. This permits the sprayer to be used intermittently for long periods of time without requiring cleaning of the critical passages with a wire or the like.

The proportioning action of the eductor 16 of FIGS. 1 and 2 is achieved by the co-action of the inlet passage 21, the aspiration chamber 22 and the diffusion passage 28. It has been discovered that the inlet passage need not be circular as was previously considered necessary but may have square cross section as shown in FIG. 2 or other non-circular cross section to provide a highly turbulent discharge stream. The diffusion passage, however, must be substantially cylindrical, that is, cylindrical, or if tapered, having at most an included angle of two or three degrees. The diffusion passage must also have a length at least equal to its diameter and preferably several times its diameter to achieve the required proportioning operation. The diffusion passage may be preceded by a receiving chamber or passage of larger diameter such as the passage 29.

FIGS. 3 and 4 illustrate other cross sectional configurations for the inlet passage 21. For example, in FIG. 3 the inlet passage 21A is rectangular in cross section. In FIG. 3 the inlet passage of the eductor 2 at B is triangular in form. To provide the highly turbulent discharge stream from the inlet passage 21, 21A and 21B it is preferable that the inlet passage have at least two substantially straight sides and be arranged to direct the high velocity discharge stream into the aspiration chamber with a velocity substantially in the direction of the flow of the carrier stream through the eductor to provide a solid integral discharge stream.

FIGS. 5, 6 and 7 illustrate various types of eductors in a sectional elevation view that may be substituted for the eductor 16 in the spray gun of FIG. 1.

In FIG. 5 and eductor 40 positioned within the body 10 comprises a first bushing 41 which defines a non circular inlet passage 42 such as shown in FIGS. 2, 3 and 4. The inlet passage 42 has a very short length compared to its diameter as shown. The bushing 41 also forms a passage 43 which directs the flow of the first liquid into the inlet passage 42. The inlet passage 42 directs the carrier stream of the first liquid into a cylindrical diffusion passage 44 formed in a second bushing 45. The diffusion passage 44 has a larger cross sectional area than the inlet passage 42. The bushings 41 and 45 are spaced apart to provide an aspiration chamber 46 which is connected by the chemical inlet passage 23 to the chemical solution to be educted.

In FIG. 5, an eductor 50 includes a first bushing 51 provided with a first bore 52, a tapered passage 53 and a non circular inlet passage 54 such as shown in FIGS. 2, 3 and 4. A second bushing 55 of the eductor 50 is provided with a cylindrical diffusion passage 56 of larger cross sectional area than the inlet passage 54 and an outlet passage 57 of larger diameter than the diffusion passage 56. An aspiration chamber 58 is formed by the space between the two bushings 51 and 58 and is connected to the chemical to be educted through the chemical inlet 23.

In FIG. 6, an eductor 60 is formed by a pair of bushings 61 and 66 disposed within the body member 10. The first bushing 61 is provided with a first bore 62, a tapered passage 63 and an inlet passage 64 of non circular configuration such as illustrated in FIGS. 2, 3 and 4. The inlet passage 64 directs the highly turbulent discharge stream of the first liquid through an aspiration chamber 65 formed by the space between the two bushings into a short tapered receiving passage 67 and then into a cylindrical diffusion passage 68 formed in the bushing 66. The operation of the eductors 40, 50 and 60 is the same as the operation of the eductor 16. Again, it is necessary to provide a substantially cylindrical diffusion passage in the chemical eductor having a length at least equal to its diameter and preferably several times its diameter to achieve the proportioning operation.

FIG. 8 illustrates another type of garden hose sprayer having a body 70 which defines a liquid passage 71 therethrough between an inlet 73 and an outlet 74. The inlet 73 may form a female hose coupling to accept the male connection of a conventional garden hose. An inlet passage 75 of square cross sectional configuration is formed in the passage 71 between the inlet 73 and the outlet 74 thereof as shown. The inlet passage 75 introduces a highly turbulent stream of the first liquid or water into a cylindrical diffusion passage 76 having a length greater than its diameter. A restriction bushing 77 is provided in the outlet end 74 of the passage 76. The restriction bushing 77 is provided with a choke passage 78 which is of smaller cross sectional area than the diffusion passage 76 and of larger cross sectional area than the inlet passage 75. The choke passage 78 functions as a restriction to cause the diffusion passage 76 to be flooded or sealed by the first liquid leaving the inlet passage 75 which creates a low pressure area 72 adjacent the connection of the inlet passage 75 to the diffusion passage 76. The low pressure area adjacent the connection of the inlet passage 75 to the diffusion passage 76 functions as an aspiration chamber 72. A chemical inlet 78 is formed in the body 70 and connects the low pressure or aspiration chamber by a suction tube 79 to a chemical solution disposed within a container 80 (partially shown) such as a jar depending from a threaded collar 81 formed in the body 70. The low pressure (below atmospheric pressure) created in the aspiration chamber 72 during operation of the sprayer raises the chemical solution from the container 80 through the conduit 79 and the chemical inlet passage 78 into the aspiration chamber 72 where it is entrained in the discharge stream from the inlet passage 75. An atmospheric control port 82 is formed in the body member and connects the low pressure area to the atmosphere. When the port 82 is open to atmosphere, air is drawn into the aspiration chamber 2 to raise the pressure and prevent chemical from being entrained in the discharge stream from the inlet passage 75. When it is desired to spray the chemical solution, it is only necessary for the operator to place a finger or thumb over the end of the port 82, thereby closing the port to atmosphere and causing the chemical to be entrained in the discharge stream from the inlet passage 75. The mixture of the water and chemical solution is discharged from the choke passage 78 against a deflector 84 formed by the body member and broken into fine droplets that may be applied to the foliage to be treated.

The eductor of FIG. 8 is formed by the inlet passage 75, the aspiration chamber 72 and the diffusion passage 76. The choke passage 78 permits the use of a shorter diffusion passage than would be necessary if the choke passage 78 were dispensed with.

FIG. 9 illustrates another type of garden hose sprayer similar to the sprayer of FIG. 8 having a body 90 which defines a liquid passageway 91 therethrough between an inlet 93 and an outlet 94. An inlet passage 95 of square cross sectional configuration is formed in the passage 71 as shown. The inlet passage 95 introduces a highly turbulent stream of the first liquid or water from the inlet 93 into a cylindrical diffusion passage 96 having a length greater than its diameter. Outlet passages 97 and 98 and a perforated plate 99 are disposed between the diffusion passage 96 and the outlet 94. The perforated plate 99 functions as a restriction to cause the diffusion passage 96 and the outlet passages 97 and 98 to be flooded or sealed by the first liquid leaving the inlet passage 95. The action of the discharge stream from the inlet passage 95 in flooding or sealing against the walls of the diffusion passage 96 creates a low pressure area 92 adjacent the connection of the inlet passage 95 to the diffusion passage 96. This low pressure area functions as an aspiration chamber 92. A chemical inlet passage 100 is formed in the body 90 and connects the aspiration chamber 92 through a choke bushing 101 to a suction tube 102 which is submersed in a chemical solution contained within a container 103 (partially shown) such as a jar depending from a threaded collar 104 formed in the body 90. An atmospheric control port 105 is also formed in the body member and functions in the same manner as the atmospheric control port 102 in the sprayer of FIG. 8. The sprayer of FIG. 9 functions in the manner as described in connection with the sprayer of FIG. 8 except that instead of a deflector 84 the perforated plate 99 is provided to break the discharge stream of the sprayer into a series of fine discharge streams for application to the foliage to be treated. The eductor in the sprayer of FIG. 9 is formed by the inlet passage 95, the aspiration chamber 92 and the diffusion passage 96. The perforated plate or restriction 99 permits the use of a shorter diffusion passage 96 than would be necessary if the plate 99 were dispensed with.

There has thus been disclosed a garden sprayer having a proportioning eductor which provides a highly turbulent discharge stream from the inlet passage into the aspiration chamber to prevent undissolved particles in the chemical solution from settling out and to effectively wash the chemical solution out of the aspiration chamber and passages downstream from the aspiration chamber after the chemical solution has been applied.

I claim:

1. A proportioning garden hose sprayer for educting a second liquid into a carrier stream of a first liquid comprising:
   (a) a body member defining a liquid passageway therethrough between an inlet and an outlet,
   (b) an eductor disposed in the passageway and having an inlet passage, an aspiration chamber and a cylindrical diffusion passage connected in series relationship, and
   (c) a conduit connecting the aspiration chamber to a source of the second liquid,
   (d) the inlet passage having a non-circular cross sectional configuration for providing a highly turbulent and high velocity discharge stream having a velocity substantially in the direction of the flow to provide a solid integral discharge stream,
   (e) the aspiration chamber being constructed to permit the boundary of the discharge stream from the inlet passage to directly contact the second liquid to permit entrainment of the second liquid into the first liquid,
   (f) the diffusion passage being concentrically aligned with the inlet passage and having a larger cross sectional area than the inlet passage and a length at least equal to its diameter for confining the discharge stream from the inlet passage to allow the transfer of energy from the high velocity discharge stream to the second liquid.

2. A proportioning garden hose sprayer for educting a second liquid into a carrier stream of a first liquid comprising:
   (a) a body member defining a liquid passageway therethrough between an inlet and an outlet,
   (b) an eductor disposed in the passageway and having an inlet passage, an aspiration chamber and a cylindrical diffusion passage connected in series relationship, and
   (c) a conduit connecting the aspiration chamber to a source of the second liquid,
   (d) the inlet passage having a rectangular cross sectional configuration for providing a highly turbulent and high velocity discharge stream having a velocity substantially in the direction of the flow to provide a solid integral discharge stream,
   (e) the aspiration chamber being constructed to permit the boundary of the discharge stream from the inlet passage to directly contact the second liquid to permit entrainment of the second liquid into the first liquid,
   (f) the diffusion passage being concentrically aligned with the inlet passage and having a larger cross sectional area than the inlet passage and a length at least equal to its diameter for confining the discharge stream from the inlet passage to allow the transfer of energy from the high velocity discharge stream to the second liquid.

3. A proportioning garden hose sprayer for educting a second liquid into a carrier stream of a first liquid comprising:
   (a) a body member defining a liquid passageway therethrough between an inlet and an outlet,
   (b) an eductor disposed in the passageway and having an inlet passage, an aspiration chamber and a cylindrical diffusion passage connected in series relationship, and (c) a conduit connecting the aspiration chamber to a source of the second liquid, (d) the inlet passage having a square cross sectional configuration for providing a highly turbulent and high velocity discharge stream having a velocity substantially in the direction of the flow to provide a solid integral discharge stream, (e) the aspiration chamber being constructed to permit the boundary of the discharge stream from the inlet passage to directly contact the second liquid to permit entrainment of the second liquid into the first liquid, (f) the diffusion passage being concentrically aligned with the inlet passage and having a larger cross sectinal area than the inlet passage and a length at least equal to its diameter for confining the discharge stream from the inlet passage to allow the transfer of energy from the high velocity discharge stream to the second liquid.

4. A proportioning garden hose sprayer for educting a second liquid into a carrier stream of a first liquid comprising:

(a) a body member defining a liquid passageway therethrough between an inlet and an outlet, (b) an eductor disposed in the passageway and having an inlet passage, an aspiration chamber and a cylindrical diffusion passage connected in series relationship, and (c) a conduit connecting the aspiration chamber to a source of the second liquid, (d) the inlet passage having a triangular cross sectional configuration for providing a highly turbulent and high velocity discharge stream having a velocity substantially in the direction of the flow to provide a solid integral discharge stream, (e) the aspiration chamber being restricted to permit the boundary of the discharge stream from the inlet passage to directly contact the second liquid to permit entrainment of the second liquid into the first liquid, (f) the diffusion passage being concentrically aligned with the inlet passage and having a larger cross sectional area than the inlet passage and a length at least equal to its diameter for confining the discharge stream from the inlet passage to allow the transfer of energy from the high velocity discharge stream to the second liquid.

5. A proportioning garden hose sprayer for educting a second liquid into the carrier stream of a first liquid under pressure comprising:

(a) a body member defining a liquid passageway therethrough between an inlet and an outlet, (b) an eductor disposed in the passageway and having an inlet passage, an aspiration chamber and a cylindrical diffusion passage connected in series relationship, and (c) a conduit connecting the aspiration chamber to a source of the second liquid, (d) the inlet passage having at least two substantially straight sides for providing a highly turbulent and high velocity discharge stream having a velocity substantially in the direction of flow to provide a solid integral discharge stream, (e) the aspiration chamber being constructed to permit the boundary of the discharge stream from the inlet passage to directly contact the second liquid to permit entrainment of the second liquid into the first liquid, (f) the diffusion passage being concentrically aligned with the inlet passage and having a larger cross sectional area than the inlet passage and a length at least equal to its diameter for confining the discharge stream from the inlet passage to allow the transfer of energy from the high velocity discharge stream to the second liquid.

6. A proportioning garden hose sprayer as defined in claim 5 wherein the diffusion passage has a length equal to at least twice its diameter.

7. A proportioning garden hose sprayer as defined in claim 5 including choke means disposed between the diffusion passage and the outlet of the sprayer having an open cross sectional area smaller than the cross sectional area of the diffusion passage and larger than the cross sectional area of the inlet passage.

8. A proportioning garden hose sprayer as defined in claim 1 wherein the inlet passage has an elliptical cross-sectional configuration.

9. A proportioning garden hose sprayer as defined in claim 1 wherein the inlet passage has a cross-sectional configuration in the form of a polygon.

References Cited by the Examiner
UNITED STATES PATENTS

| | | | |
|---|---|---|---|
| 1,458,975 | 6/23 | Clauson | 239—433 |
| 2,083,851 | 6/37 | Marcy | 239—433 |
| 2,544,539 | 3/51 | Manders | 239—433 |
| 2,571,871 | 10/51 | Hayes | 239—521 |
| 2,592,896 | 4/52 | Hayes | 239—348 |

EVERETT W. KIRBY, *Primary Examiner.*

LOUIS J. DEMBO, *Examiner.*